US012689097B2

(12) United States Patent
Sebzda et al.

(10) Patent No.: US 12,689,097 B2
(45) Date of Patent: Jul. 21, 2026

(54) BATTERY CELL SEPARATOR

(71) Applicant: MILWAUKEE ELECTRIC TOOL CORPORATION, Brookfield, WI (US)

(72) Inventors: Richard M. Sebzda, Wauwatosa, WI (US); Gurusiddeshwar Gudimani, Plymouth, WI (US); David Hernandez, Jr., Waukesha, WI (US); Jin Cai Li, Dongguan City (CN)

(73) Assignee: Milwaukee Electric Tool Corporation, Brookfield, WI (US)

( * ) Notice: Subject to any disclaimer, the term of this patent is extended or adjusted under 35 U.S.C. 154(b) by 736 days.

(21) Appl. No.: 17/691,617

(22) Filed: Mar. 10, 2022

(65) Prior Publication Data

US 2022/0311099 A1    Sep. 29, 2022

(30) Foreign Application Priority Data

Mar. 26, 2021    (CN) .......................... 202110327988.2

(51) Int. Cl.
*H01M 50/505*    (2021.01)
*H01M 50/247*    (2021.01)

(52) U.S. Cl.
CPC ....... *H01M 50/505* (2021.01); *H01M 50/247* (2021.01); *H01M 2220/30* (2013.01)

(58) Field of Classification Search
None
See application file for complete search history.

(56) References Cited

U.S. PATENT DOCUMENTS

| | | |
|---|---|---|
| 4,780,379 A | 10/1988 | Puester |
| 5,563,002 A | 10/1996 | Harshe |
| 5,709,966 A | 1/1998 | Sawada et al. |
| 6,511,766 B1 | 1/2003 | Loutfy et al. |
| 6,972,544 B2 | 12/2005 | Seman, Jr. et al. |
| 7,686,853 B2 | 3/2010 | Seman, Jr. et al. |
| 8,895,175 B2 | 11/2014 | Ouchi et al. |
| 9,576,746 B2 | 2/2017 | Ueno et al. |

(Continued)

FOREIGN PATENT DOCUMENTS

| | | |
|---|---|---|
| CN | 103996812 A | 8/2014 |
| CN | 204577503 U | 8/2015 |

(Continued)

OTHER PUBLICATIONS

Machine translation of CN103996812 (Year: 2024).*

(Continued)

*Primary Examiner* — Miriam Stagg
*Assistant Examiner* — M. T. Leonard
(74) *Attorney, Agent, or Firm* — Michael Best & Friedrich LLP

(57) ABSTRACT

A battery pack including a housing and a plurality of battery cells at least partially received within the housing. The plurality of battery cells include adjacent first and second battery cells arranged within the housing in a common relative orientation. A separator forms a physical barrier between a portion of the first battery cell and a portion of the second battery cell. An electrically conductive member connects a third battery cell to at least one of the first and second battery cells. The separator supports the electrically conductive member integrally formed therein.

18 Claims, 9 Drawing Sheets

(56)                    References Cited

U.S. PATENT DOCUMENTS

| | | | |
|---|---|---|---|
| 9,748,549 | B2 | 8/2017 | Gonzales et al. |
| 10,529,966 | B2 | 1/2020 | Shoji et al. |
| 2004/0257038 | A1 | 12/2004 | Johnson et al. |
| 2006/0019155 | A1 | 1/2006 | Seman, Jr. et al. |
| 2008/0254356 | A1* | 10/2008 | Liersch ............... H01M 10/425 429/97 |
| 2008/0284373 | A1 | 11/2008 | Watson et al. |
| 2009/0061302 | A1* | 3/2009 | Scott .................... H01M 50/51 29/730 |
| 2011/0253402 | A1 | 10/2011 | Aradachi et al. |
| 2013/0143075 | A1 | 6/2013 | Yi |
| 2016/0301109 | A1 | 10/2016 | Peng et al. |
| 2017/0279095 | A1 | 9/2017 | Reese et al. |
| 2018/0076491 | A1 | 3/2018 | Shoji et al. |
| 2022/0029223 | A1* | 1/2022 | Jung ................... H01M 50/262 |

FOREIGN PATENT DOCUMENTS

| | | | |
|---|---|---|---|
| CN | 210136944 | U | 3/2020 |
| CN | 107431158 | B | 12/2020 |
| DE | 102013207535 | B4 | 7/2017 |
| EP | 2212942 | B1 | 12/2017 |
| EP | 3059782 | B1 | 4/2018 |
| FR | 2922378 | A1 * | 4/2009 ......... H01M 50/522 |
| JP | 2019139927 | A | 8/2019 |
| WO | 2020067606 | A1 | 4/2020 |

OTHER PUBLICATIONS

FR2922378A1 machine translation (Year: 2026).*
Chinese Patent Office Action for Application No. 202110327988.2 dated Dec. 15, 2023 (17 pages including machine English translation).
International Search Report and Written Opinion for Application No. PCT/US2022/019741 dated Jun. 21, 2022 (11 pages).
Extended European Search Report for Application No. 22776311.7 dated Jan. 13, 2025 (10 pages).

* cited by examiner

BATTERY CELL SEPARATOR

FIELD

The present application relates to a battery cell separator for a battery pack such as a power tool battery pack, and more specifically, to a separator with integrally formed conductive elements for electrically communicating battery cells.

Typical power tool battery packs include multiple rechargeable battery cells arranged and supported within a housing. Conductors may be utilized to electrically connect battery cells to one another. Such conductors generally include flexible wires, ductile cable, or the like routed within the housing and braced or tacked therein.

SUMMARY

In one embodiment, a battery pack includes a housing, a plurality of battery cells at least partially received within the housing, a separator, and an electrically conductive member integrally formed in the separator. The plurality of battery cells include a first battery cell and a second battery cell adjacent the first battery cell, and the first battery cell and the second battery cell arranged within the housing in a common relative orientation. The separator forms a physical barrier between a portion of the first battery cell and a portion of the second battery cell. The electrically conductive member connects a third battery cell of the plurality of battery cells to at least one of the first battery cell and the second battery cell.

In another embodiment, a battery cell separator forms a barrier between adjacent battery cells in a battery pack assembly, and each battery cell includes first and second opposing terminals as well as a cell body extending therebetween the terminals along a longitudinal direction. The battery cell separator includes a conductor that electrically connects the terminals of two or more battery cells in the battery pack together. The conductor extends along a length of the battery cell separator in a first direction. The battery cell separator further includes a wall that extends along the first direction and supports the adjacent battery cells in a predetermined arrangement. The first direction and the longitudinal direction are substantially parallel relative one another when the adjacent battery cells are in the predetermined arrangement. A portion of the conductor is overmolded with the wall.

In yet another embodiment, a method of manufacturing a battery pack assembly includes positioning a plurality of battery cells within a housing, in which each battery cell in the plurality of battery cells includes first and second opposing terminals and a cell body extending therebetween along a longitudinal direction, and orienting at least two battery cells in a common relative orientation in which the longitudinal directions of the at least two commonly oriented battery cells are substantially parallel relative one another. The method further includes providing a conductor within the housing, overmolding the conductor with a non-conductor material to thereby form a support assembly that includes a wall, and supporting the at least two commonly oriented battery cells on opposing sides of the wall. The wall separates the respective cell bodies of the at least two commonly oriented battery cells from one another, and the conductor electrically connects one or more terminals of different battery cells together.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

FIGS. 1-6 illustrate a battery pack 10 embodying aspects of the invention. The battery pack 10 can be connectable to electrical equipment, such as, for example, a cordless power tool (e.g., drill, saw, vacuum, etc.), a powered garment (e.g., heat-able coat), alight (e.g., flood light, flashlight, etc.), or the like to selectively power the electrical equipment. The battery pack 10 can be removable from the electrical equipment and can be rechargeable by, for example, a battery charger.

Figure 1:
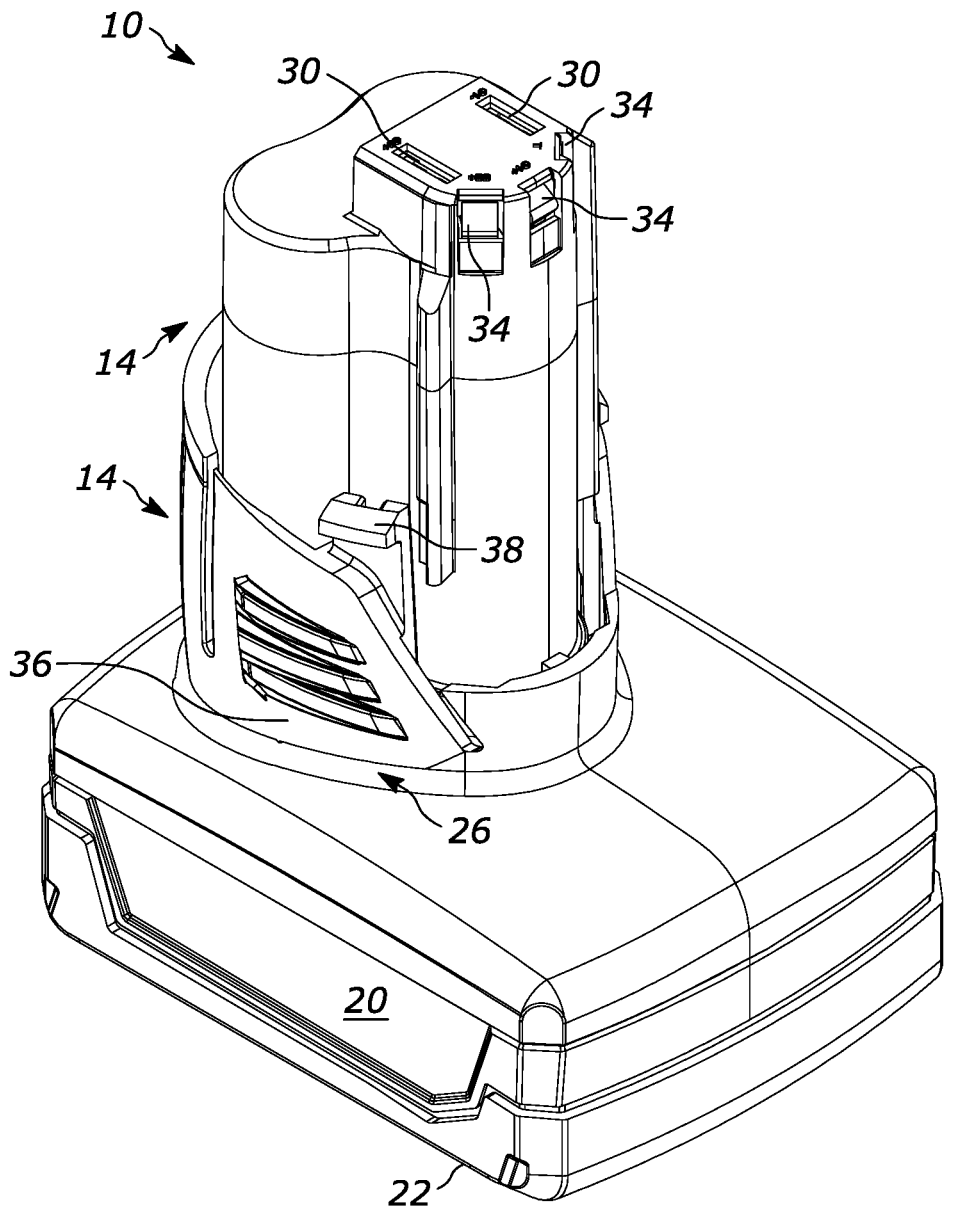
FIG. 1 is a perspective view of a battery pack, according to one embodiment.
Figure 2:
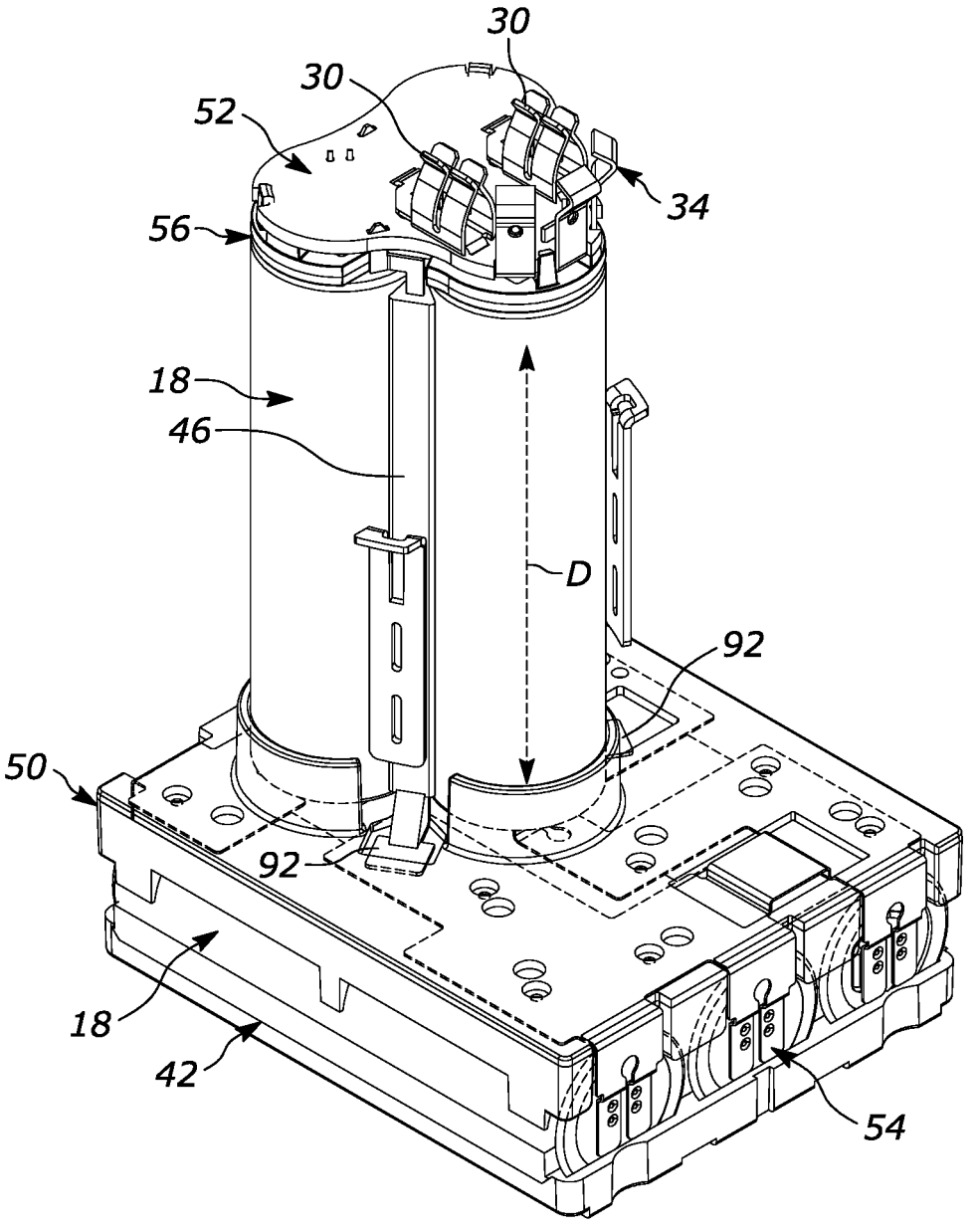
FIG. 2 is a perspective view of the battery pack of FIG. 1 with a housing hidden to shown internal components of the battery pack.

As shown in FIGS. 1 and 2, the battery pack 10 includes a housing 14 and an assembly or plurality of individual battery cells 18 supported by/received within the housing 14. In the illustrated embodiment, the battery pack 10 is a 12.0V battery pack including six approximately 3.6V battery cells C1, C2, C3, C4, C5, C6 connected in two units wired in parallel with one another. Each unit includes three cells wired in series with the cells of the same unit.

In other constructions, the battery pack 10 can be a 21V battery pack including five approximately 4.2V battery cells all connected in series. In another construction, the battery pack 10 can be a 28V battery pack including seven approximately 4.2V battery cells. In still other constructions, the battery pack 10 includes at least six battery cells to have a nominal voltage of approximately 28V. In further constructions, the battery pack 10 may have another nominal battery voltage, such as, for example, 9.6V, 14.4V, 24V, 28V, 40V, etc., to power the electrical equipment and be charged by the battery charger. In even further constructions, the battery pack 10 may be configured to be a high-power output battery pack having a nominal voltage of at least 80V. It should be understood that, in other constructions, the battery cells may have a different nominal cell voltage and/or may be connected in another configuration, such as, for example, in parallel or in a variety of parallel/series combinations.

The battery cells 18 may be any rechargeable battery cell chemistry type such as nickel cadmium (NiCd), nickel-metal hydride (NiMH), Lithium (Li), Lithium-ion (Li-ion), other Lithium-based chemistry, other rechargeable battery cell chemistry, etc. The lithium-ion (Li-ion) battery cells can have a chemistry of Lithium-Cobalt (Li—Co), Lithium-Manganese (Li—Mn) Spinel, Li—Mn Nickel, another lithium metal chemistry, or the like.

With brief reference to FIG. 1, the housing 14 includes a base 20, a grip portion 22, a locking or latching assembly 26, at least two power terminals 30, and three or more control terminals 34. The base 20 is configured to support the battery pack 10 on a support surface (e.g., table, bench, etc.). The grip portion 22 may be integrally formed with the housing 14 and/or attachable thereon to increase the friction between the battery pack 10 and the support surface. The latching assembly 26 includes actuators 36 and locking members 38 moveable by the actuators 36 between a locked position, in which the locking members 38 engage a corresponding locking member on an electrical component or charger to lock the battery pack 10 to the electrical component/charger, and an unlocked position. As will be described in greater detail below, the power terminals 30 are configured to transfer power from the battery cells 18 to an electrical component and from the charger to the battery cells 18. Similarly, the control terminals are arranged to carry commands, data, signals, or the like between the battery pack 10, battery cells 18, electrical component/charger, and other electrical components of the battery pack 10 (e.g., thermistor, sensor, voltage tap, etc.).

Figure 3:
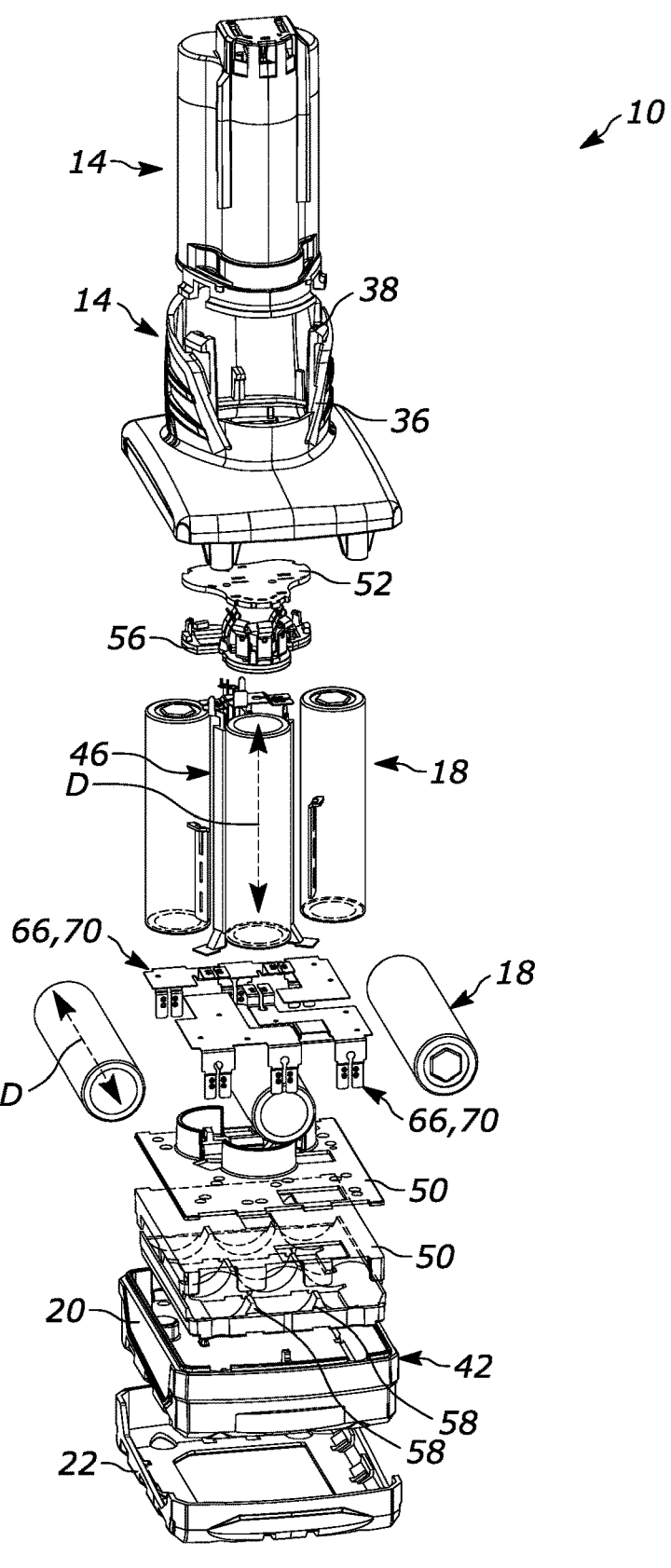
FIG. 3 is an exploded view of the battery pack of FIG. 1.

Referring now to FIGS. 2 and 3, the battery pack 10 further includes a first cell separator and support assembly 42, a second cell separator and support assembly 46, insulators 50, a printed circuit board assembly or "PCBA" 52, circuitry 54, and one or more holders 56. Both the first and second cell separators 42, 46 are arranged in the battery pack 10 to retain the battery cells 18 within the housing 14. In the illustrated embodiment, the first cell separator 42 is arranged in a lower part of the housing 14 relative the second cell separator 46 such that the first cell separator and support assembly 42 may be a lower separator 42 and the second cell separator and support assembly 46 may be an upper separator 46. As illustrated in FIG. 2, the battery cells 18 supported by the lower separator 42 are arranged substantially perpendicularly to the battery cells 18 supported by the upper separator 46 but could also be offset relative one another by a different amount. In some embodiments, the battery cells are supported by separators and are arranged in a variety of configurations with respect to one another. In other embodiments, the battery cells are arranged in a similar configuration with respect to one another.

The lower cell separator 42 and the upper cell separator 46 may formed from a non-conductive or highly resistive material such as a thermoset polyester, a fiberglass reinforced thermo plastic, or the like. The lower cell separator 42 may include separating walls 58 configured to separate or isolate (e.g., thermally insulate, conductively isolate, etc.) adjacent cells 18 from one another. Similarly, the upper cell separator 46 includes one or more walls 62 configured to physically separate or isolate (e.g., thermally insulate, conductively isolate, etc.) at least a portion of the two adjacent battery cells 18. As described in greater detail below, the walls 58, 62 may be electrically resistive or "insulative" and may form a physical barrier between at least a portion of the two adjacent battery cells 18. As shown in FIG. 2, the lower separator 42 may support three battery cells 18 in a horizontal configuration relative the base 20, and the upper separator 46 may support three battery cells 18 in a vertical configuration relative the base 20.

As further shown in FIG. 2, each battery cell 18 is elongated along a longitudinal direction D, and each separator 42, 46 may extend along the longitudinal direction D relative the adjacent battery cells 18 being separated. In the illustrated embodiment, the separators 42, 46 may each be used to support and physically isolate at least two commonly oriented adjacent battery cells 18 extending in a common direction (e.g., each cell 18 extending in a parallel longitudinal direction D). For example, the upper separator 46 extending along a first direction (e.g., in a vertical direction relative the base 20) may support and separate at least two battery cells 18 elongated along the same first direction and arranged in a similar relative orientation. In other embodiments, the separators 42, 46 could support and/or isolate a different number of battery cells 18 in another configuration. The walls 62 may be elongated similarly to the battery cells 18 and may contact the battery cells 18 being separated to provide an elongated surface contact between the walls 62 and cells 18. The walls 62 may also assist in physically supporting battery cells 18 within the housing 14.

With continued reference to FIGS. 2 and 3, the insulators 50 may be positioned generally between the lower cell separator 42 and the upper cell separator 46 and may, in one example construction, provide insulation between battery cells 18 supported by different separators 42, 46. The insulators 50 may be formed from a non-conductive or highly resistive material, similar to the separators 42, 46. In this manner, individual battery cells 18 are substantially isolated within the battery pack 10. Insulation may also be provided between battery cells 18 and another component, such as a portion of the circuitry 54 (FIG. 2). For example, in one construction of the battery pack 10, the insulators 50 are provided between the vertically oriented battery cells 18 and the PCBA 52 or power/control terminals 30, 34 as well as between battery cells 18 supported by the lower cell separator 42 and the battery cells supported by the upper cell separator 46. In another construction of the battery pack 10, the insulator 50 is provided between the battery cells 18 and another electrical component such as a power tool, a circuit board, a charging interface, or the like.

As further shown in FIGS. 2 and 3, the one or more holders 56 may be supported on an upper end of the battery cells 18 to support the PCBA 52 and power/control terminals 30, 34. The holders 56 may be formed from a similar material as the separators 42, 46 and/or insulators 50 to insulate the battery cells 18 from the PCBA 52. In one example construction of the battery pack 10, the holders 56 are include two plate-like structures that may be snap-fitted together to internally support one or more components of the circuitry 54, as described below with reference to FIG. 8.

Figure 4A:
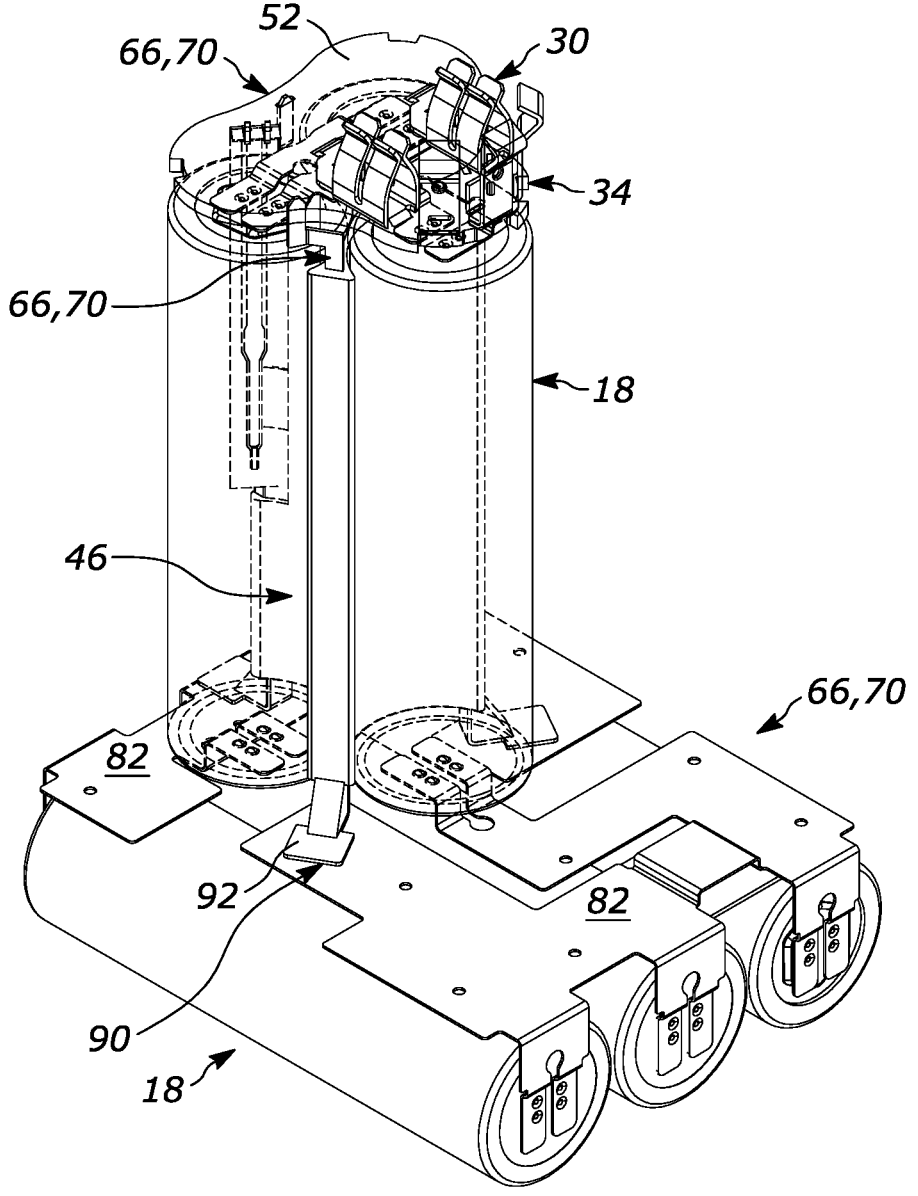
FIG. 4A is a perspective view of the battery pack of FIG. 1, showing the circuitry of the battery pack.
Figure 4B:
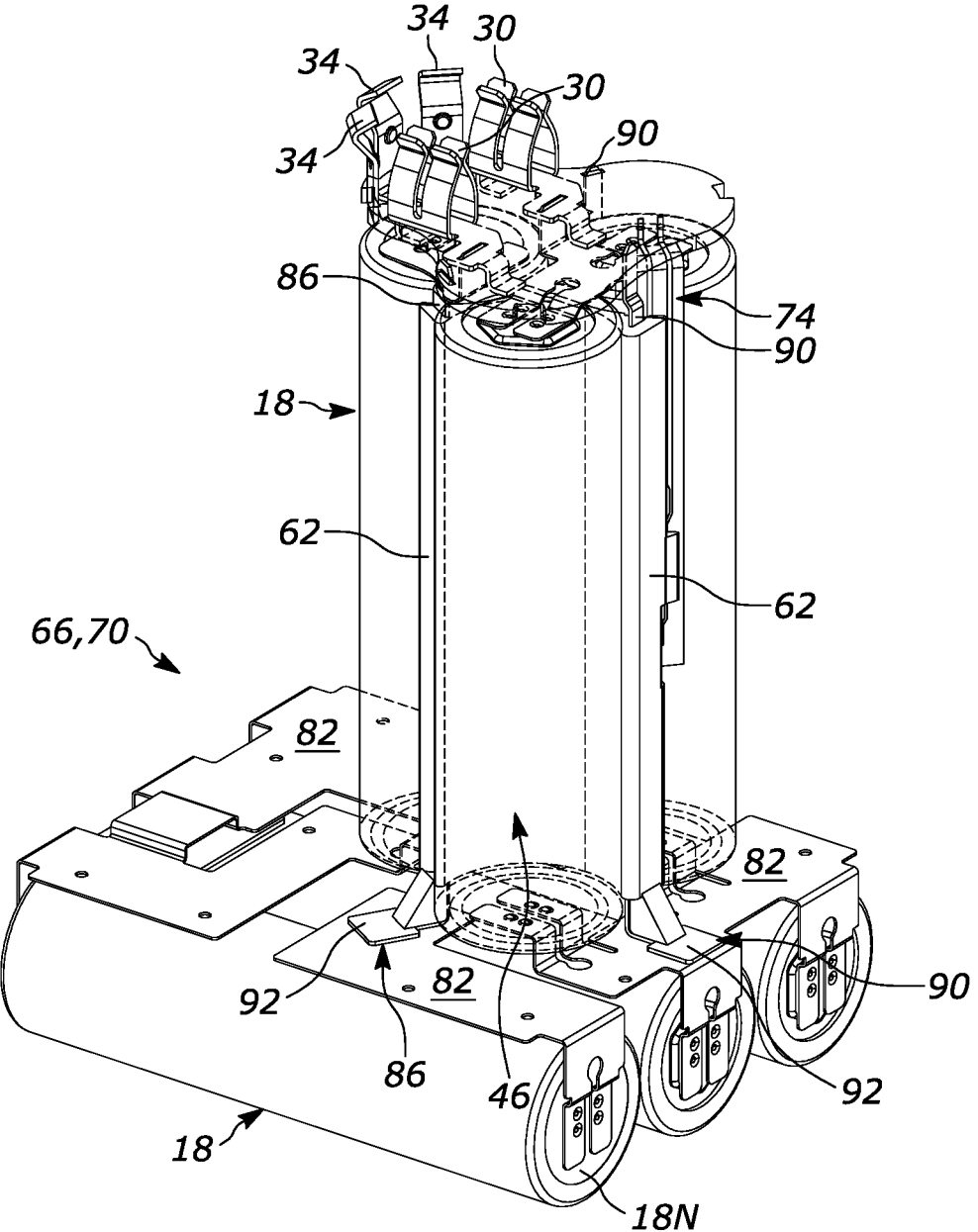
FIG. 4B is another perspective view of FIG. 4A.

As shown in FIGS. 3 and 4B, the circuitry 54 includes power conductors 66, voltage or signal conductors 70, sensors 74, and may also include the battery cells 18, the PCBA 52, the power terminals 30, and/or the control terminals 34. The power conductors 66 may be conductive power straps, power wires, or another electrically conductive member to transfer power between battery cells 18 and/or to the remaining parts of the circuitry 54. Similarly, the voltage/signal conductors 70 may be voltage taps, control wiring, signal wiring, or another electrically conductive member to communicate signals, commands, information, status, and/or voltage through the circuitry 54. In some embodiments, the conductors 66, 70 are utilized synonymously and simultaneously as common electrically conductive members. In other words, it should be understood that the power conductors are not limited to only transferring power, while the voltage/signal conductors are not limited to only communicating voltage and/or signal.

Referring now to FIGS. 4A-6, one example of the battery pack 10 construction will be described. It should be stated that while specific battery cells 18 are described herein, the orientation, designation, arrangement, etc. of the battery cells 18 may differ in other constructions.

Figure 8:
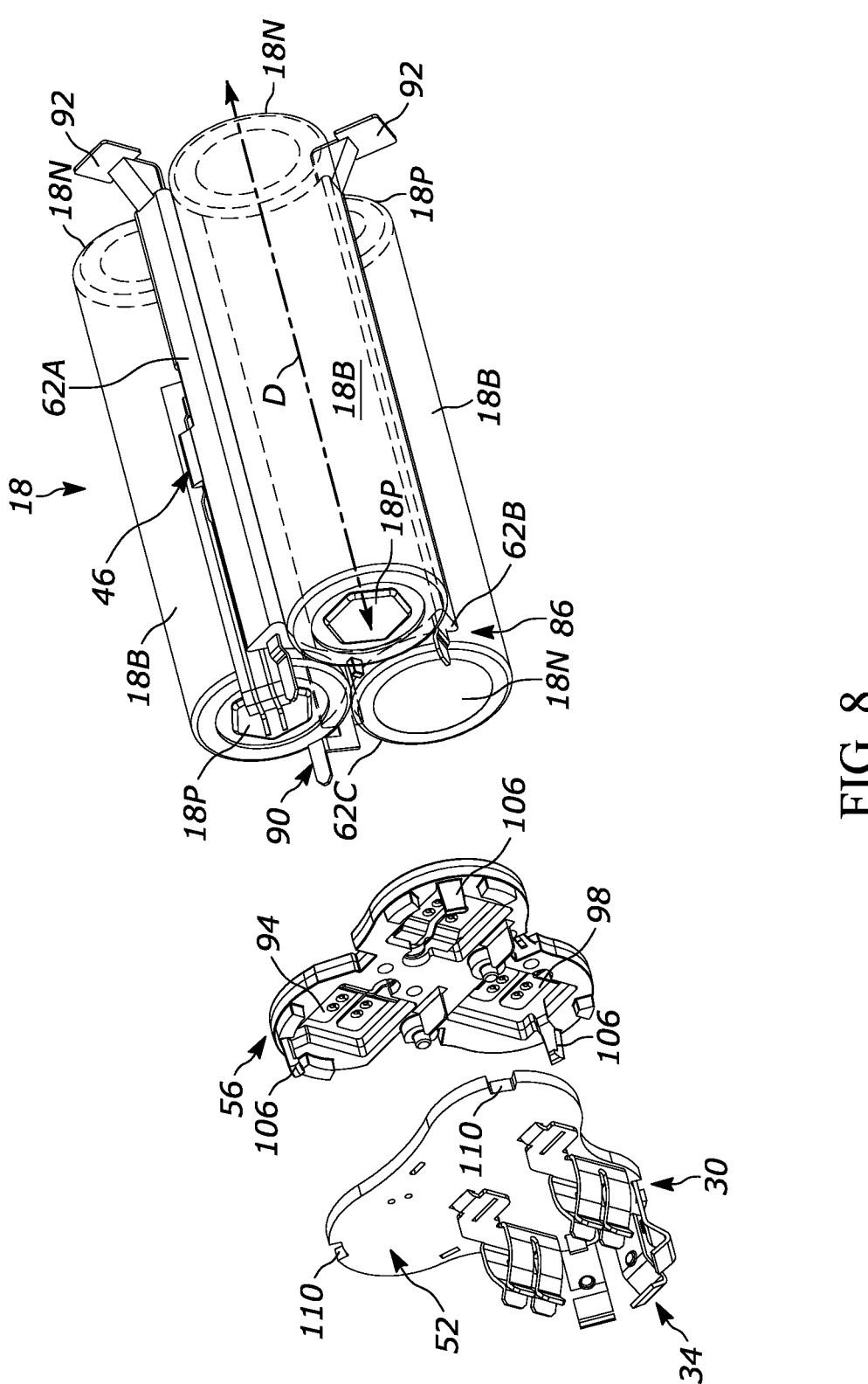
FIG. 8 is an isolated and partially exploded view of a portion of the circuitry and cell separator assembly of the battery pack of FIG. 1.

In the illustrated construction, the battery cells 18 are arranged in a 3S2P (e.g., 2 parallelly wired groups each including 3 cells wired in series) configuration. Cells C1, C2, and C3 are wired in series to define a first group U1, while cells C3, C4, and C5 are wired in series to define a second group U2. As shown in the representative diagram of FIG. 5, the first group U1 and the second group U2 are wired in parallel. As illustrated in FIG. 8, each of the battery cells 18 includes a positive electrically conductive terminal (+) 18P, a negative electrically conductive terminal (−) 18N, and a substantially electrically insulated battery cell body 18B extending between the positive and negative terminals 18P, 18N. Battery cells 18 wired in series are generally connected by opposite terminals (e.g., (+) to (−)), and units wired in parallel are generally connected by similar terminals (e.g., (+) to (+) and (−) to (−)). As shown in FIGS. 4A and 4B, terminals 18P, 18N of battery cells 18 are connected to terminals 18P, 18N of different battery cells 18 via the conductors 66, 70.

In one construction of the battery pack 10, the terminals of appropriate battery cells 18 are connected via lose or flexible wires, cables, or the like that may be braced and/or tacked to the housing 14 once proper connections are made (e.g., soldered, welded, etc.). In the illustrated construction, the terminals 18P, 18N of appropriate battery cells 18 are wired together via the conductors 66, 70, which may include and/or be formed as malleable electrically conductive members rigidly formed/supported within the battery pack 10. Any or all of the conductors 66, 70 may alternately be integrally formed in the upper cell separator 46 and/or the lower cell separator 42 to thereby reduce the amount of lose wiring. In particular, in some constructions of the battery pack 10, the walls 62 of the upper cell separator 46 may be molded over at least a portion of the conductors 66, 70 to rigidly support the conductors 66, 70 therein. In such constructions, the upper cell separator 46 embodies a vertical support structure for both a conductor and a battery cell. Stated another way, at least a portion of the upper cell separator 46 walls 62 may include an integrated conductor supported, inserted, and/or formed therein.

As illustrated in FIGS. 4A and 4B, the power conductors 66 may include horizontal power straps 82 and vertical power straps 86, while the voltage conductors 70 may include vertical voltage taps 90. Each of the vertical power straps 86 and vertical voltage taps 90 may include a base or landing pad 92 formed on an end (e.g., lower end) thereof. The power conductors 66 may also be utilized to transfer voltage/signal. Similarly, the horizontal power straps 82 may be utilized to transfer power between and electrically connect the horizontal battery cells 18 to one another. The horizontal power straps 82 may also electrically connect horizontal battery cells 18 to a lower terminal of one or more vertical battery cells 18. The vertical power strap 86 may be utilized to carry power from the horizontal battery cells 18 to an upper terminal of at least one vertical battery cell 18. In the illustrated embodiment shown in FIGS. 4B and 6, for example, one of the horizontal power straps 82 electrically connects a negative terminal 18N of a horizontal battery cell 18 to the landing pad 92 of the vertical power strap/conductor 86.

As best illustrated in FIGS. 4A and 4B, the landing pads 92 provide a base support for the vertical conductors 86, 90 at a terminating end thereof and further provide a fastening point for the vertical conductors 86, 90 to be connected to the horizontal power straps 82. In the illustrated embodiment, the landing pads 92 may be like weld pads or straps and may be welded, laser welded, or the like to the horizontal power straps 82. In other embodiments, other types of fastening or coupling methods such as soldering may be used for attaching the pads and conductors together. In still other embodiments, according to one example construction of the battery pack 10, the vertical and horizontal conductors are integrally formed together. In some constructions, the insulators 50 are positioned around or molded over (e.g., through overmolding) the pads 92 (FIG. 2) to thereby insulate a connection between one or more conductive members (e.g., vertical conductors 86, 90 and horizontal conductors 82).

The vertical voltage taps 90, which may be connected to the horizontal power straps 82, in one example, may be configured to carry voltage and/or signal vertically to upper terminals of a vertical cell 18, the control terminals 34, the power terminals 30, and or the PCBA 52. In the illustrated embodiment, PCBA 52 is supported adjacent the upper terminals of the vertical battery cells 18 at least in part by terminating ends of the vertical conductors 86, 90 that do not include the landing pads 92 (e.g., opposite end of the vertical conductors 86, 90 from the landing pads 92). It should be understood that the terms "upper" and "lower" refer to a relevant position in the illustrated construction but could be arranged in different positions and relative configurations. For example, in other embodiments, the PCBA 52 is arranged in a lower part of the battery pack 10.

Figure 5:
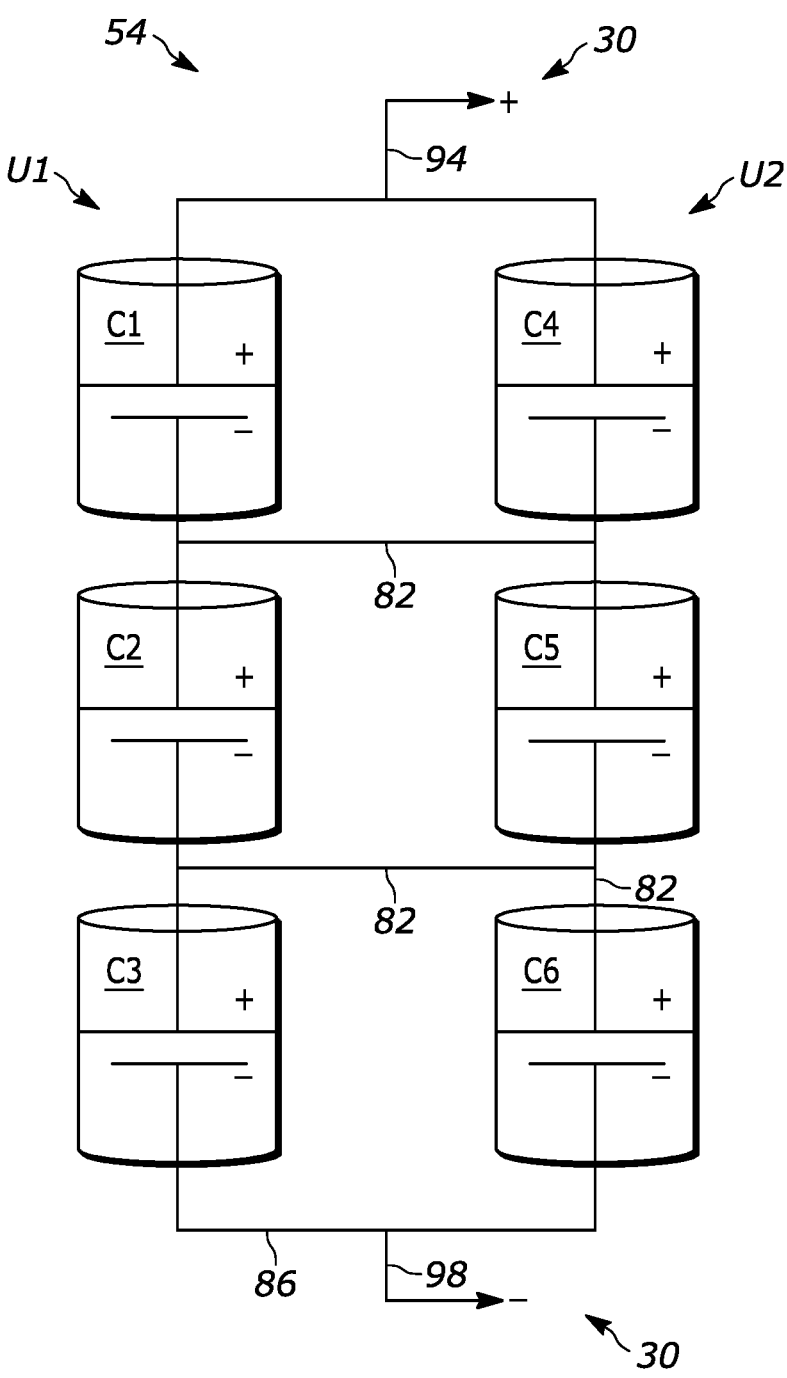
FIG. 5 is a block circuit diagram of the battery pack of FIG. 1, according to an example embodiment.
Figure 6:
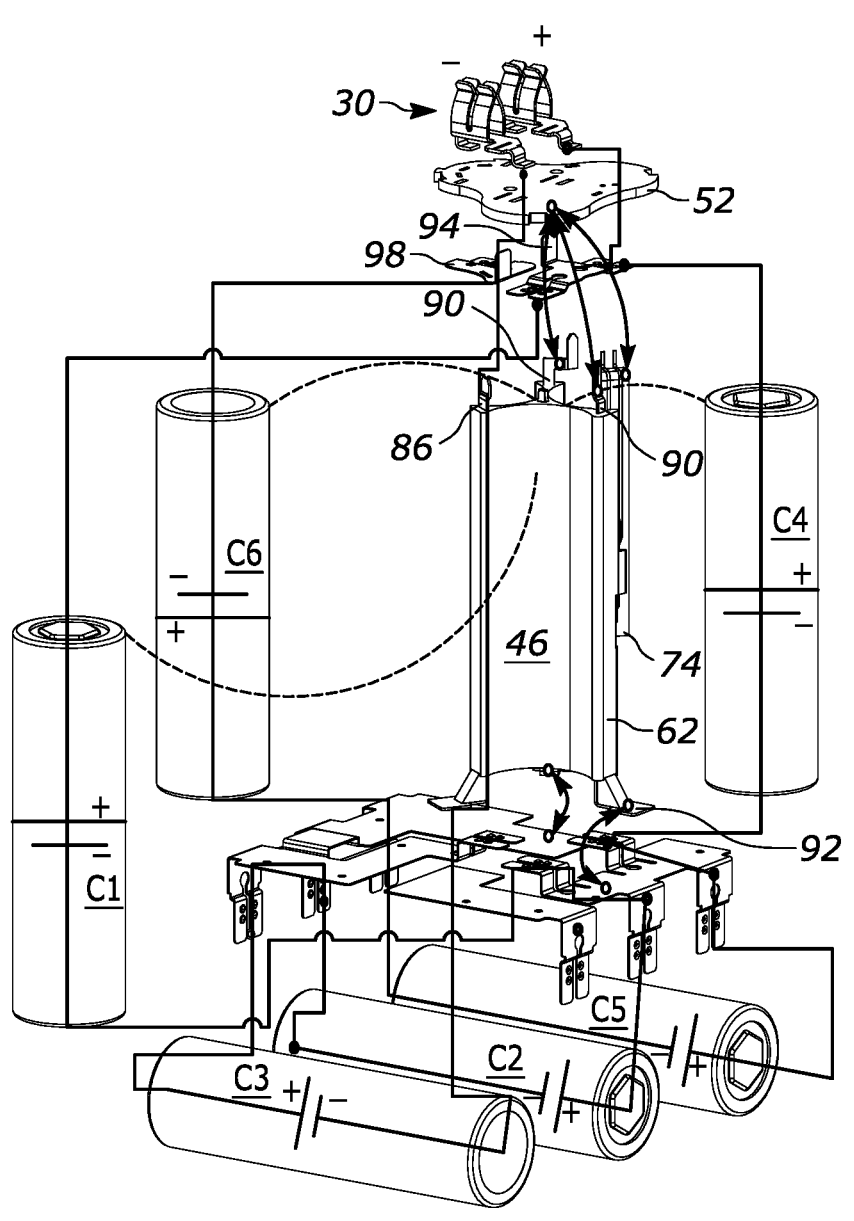
FIG. 6 is an exploded view of the battery pack of FIG. 1, showing electrical connections, according to an example embodiment.

Referring now to FIGS. 5,6, and 8, the circuitry 54 further includes a positive coupler 94 configured to connect a positive end of the first unit U1 to a positive end of the second unit U2 and a negative coupler 98 configured to connect a negative end of the first unit U1 to a negative end of the second unit U2. The circuitry 54 also incorporates the horizontal power straps 82 as jumpers between the first and second units U1, U2. As best illustrated in FIG. 8, the positive coupler 94 and negative coupler 98 may be retained within the holders 56. In one example construction, the two plates forming the holder 56 may be snapped or fused together with one or more of the couplers 94, 98 situated therebetween. In another example construction, the holders 56 and couplers 94, 98 may be formed as a single piece or plate.

As further illustrated in FIG. 8, the holders 56 may further support the PCBA 52 and may include one or more clips 106 extending from the holders 56. The clips 106 may be flexibly received in one or more apertures 110 formed on the PCBA 52 to thereby snap-fit the PCBA 52 and holders 56 together. The apertures 110 may be slots, grooves, recesses, or the like. In such construction, the PCBA 52, holders 56, and couplers 94, 98 may be "snapped together" and treated as a single or simpler element during a manufacturing or assembly process.

With specific reference to FIG. 6, one example arrangement of battery cells 18 and conductors 66, 70 will described in detail. In the illustrated construction, a positive terminal 18P of cell C4 and a positive terminal 18P of cell C1 are both wired to the positive coupler 94, which is coupled to the designated positive of the power terminals 30. A negative terminal 18N of cell C3 and a negative terminal 18N of cell C6 are both wired to the negative coupler 98, which is coupled to the designated negative of the power terminals 30. As shown in FIG. 6, cell C5 is wired between cell C4 and cell C6 and connected via horizontal power straps 82 such that power in the second unit U2 only travels vertically through cell C4 and cell C6. In the first unit U1, power travels from cell C1, through the horizontal power straps 82 to cell C2, and once again through the horizontal power straps 82 to cell C3. In the illustrated embodiment, power travels vertically from cell C3, through the vertical power strap 86 formed in the upper cell separator 46, and into the negative coupler 98.

Figure 7:
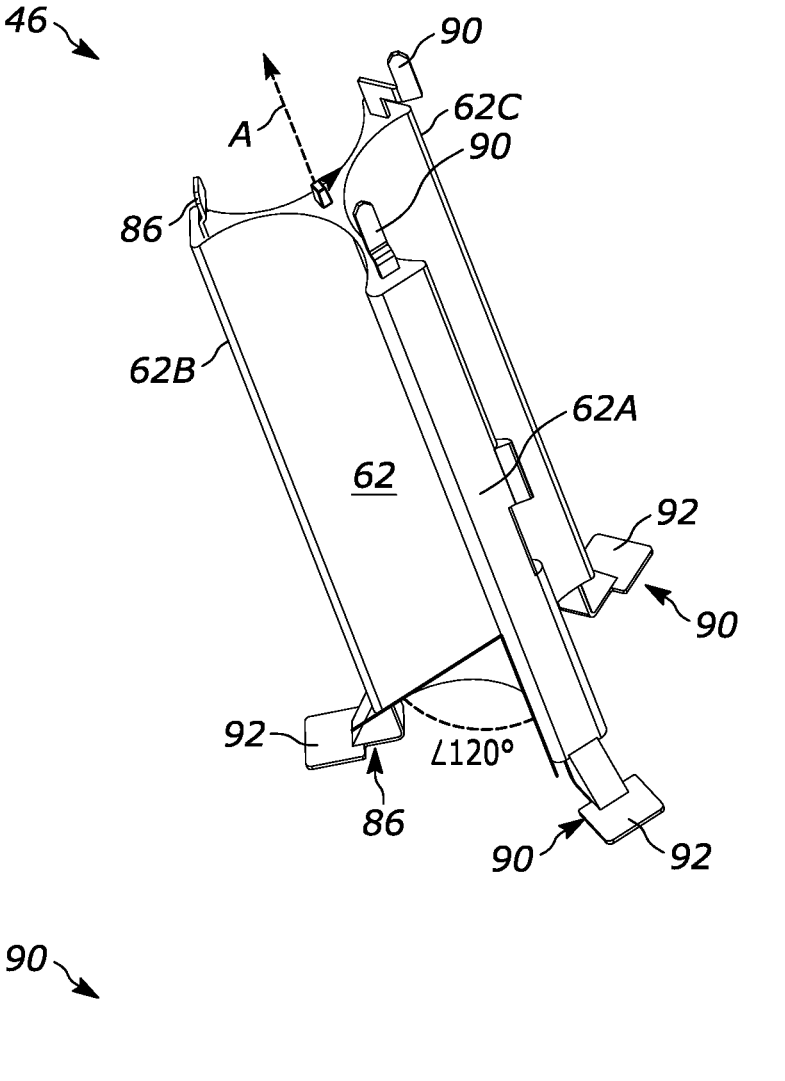
FIG. 7 is an enlarged isolated view of a cell separator assembly of the battery pack of FIG. 1.

Stated another way, the upper cell separator 46 is utilized to support conductors configured to carry power (i.e., power strap 86, power conductor 66, voltage/signal conductor 70). As further illustrated in FIGS. 6 and 7, the upper cell separator 46 supports the voltage taps 90, which are configured to transfer voltage, signal, or the like from battery cells 18, into the PCBA 52, and ultimately to the control terminals 34. FIG. 7 further illustrates a single vertical voltage taps 90 removed from the wall 62 of the upper cell separator 46. Each voltage tap 90 may include retainer tabs 102 formed along a length of the tap 90. The retainer tabs 102 may prevent the taps 90 from moving (e.g., shifting, sliding, slipping, etc.) relative to the wall 62 of the upper cell separator 46. Although the retainer tabs 102 have been described with reference to the taps 90, it should be understood that each of the conductors (i.e., straps 86, conductors 66, 70, etc.) may include one or more retaining tabs 102.

As best illustrated in FIG. 8, the wall 62 of the upper cell separator 46 extends in a similar way (i.e., along the longitudinal direction D) to the adjacent battery cells 18 separated thereby. The wall 62, which may be electrically resistive or non-conductive, primarily separates the cell bodies 18B of the adjacent battery cells 18 and does not extend above or over the battery cell terminals 18P, 18N. As also illustrated in FIGS. 7 and 8, the wall 62 of the upper cell separator 46 may project outwardly in different directions and form first, second and third separating walls 62A, 62B, 62C.

In the illustrated embodiment, the upper cell separator 46 includes a central axis A. As shown in FIGS. 7 and 8, the walls 62 extend outwardly from the central axis A and are oriented at an oblique angle relative one another about the central axis A. Stated another way, an oblique angle exists between the walls 62A, 62B, 62C of the upper cell separator 46 such that three or more adjacent battery cells 18 being separated by the upper cell separator 46 are arranged obliquely relative one another relative the central axis A. In the illustrated embodiment, the upper cell separator 46 supports two or more adjacent battery cells 18 in a common relative orientation such that the central axis A of the upper cell separator 46 and the longitudinal direction D of the two or more adjacent battery cells 18 are substantially parallel relative one another. In the illustrated embodiment, the walls 62 are evenly distributed about the central axis A. In other embodiments, the walls may be unevenly distributed about the central axis A.

In the illustrated embodiment, according to one example construction, the walls 62A, 62B, 62C of the upper cell separator 46 are radially spaced apart about the central axis A by an angle of approximately 120 degrees relative one another. The upper cell separator 46, according to another example construction, may include a fourth wall such that the first, second, third, and fourth walls may be radially spaced about the central axis A by an angle of approximately 90 degrees relative one another. In another embodiment, the walls may be arranged linearly and separated by a relative angle of approximately 180 degrees.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described. Various features of the invention are set forth in the following claims.

What is claimed is:
1. A battery pack comprising:
a housing;
a plurality of battery cells at least partially received within the housing, the plurality of battery cells including a first battery cell and a second battery cell adjacent the first battery cell, the first battery cell and the second battery cell arranged within the housing in a common relative orientation;
a separator forming a physical barrier between a portion of the first battery cell and a portion of the second battery cell; and
an electrically conductive member connecting a third battery cell of the plurality of battery cells to the first battery cell and/or the second battery cell, wherein the separator supports the electrically conductive member overmolded therein.

2. The battery pack of claim 1, wherein each battery cell in the plurality of battery cells includes a first electrically conductive terminal, a second electrically conductive terminal, and a substantially electrically insulated body portion extending between the first electrically conductive terminal and the second electrically conductive terminal along a longitudinal direction, wherein one of the first electrically conductive terminal and the second electrically conductive terminal is a positive terminal, and wherein the other one of the first electrically conductive terminal and the second electrically conductive terminal is a negative terminal.

3. The battery pack of claim 2, wherein the electrically conductive member connects the first electrically conductive terminal of the first battery cell to the first electrically conductive terminal of the third battery cell.

4. The battery pack of claim 3, wherein the common relative orientation is a first orientation, wherein the third battery cell is arranged within the housing in a second orientation, and wherein the first orientation and the second orientation are perpendicular relative one another.

5. The battery pack of claim 2, wherein the separator includes a first electrically resistive wall forming a physical barrier between a body portion of the first battery cell and a body portion of the second battery cell, wherein the separator includes a second electrically resistive wall forming a physical barrier between the body portion of the first battery cell and a body portion of a fourth battery cell, the fourth battery cell adjacent the first battery cell and the second battery cell, and wherein the separator includes a third electrically resistive wall forming a physical barrier between the body portion of the second battery cell and the body portion of the fourth battery cell.

6. The battery pack of claim 5, wherein each of the first electrically resistive wall, the second electrically resistive wall, and the third electrically resistive wall includes an electrically conductive member integrally formed therein.

7. The battery pack of claim 5, wherein the first electrically resistive wall, the second electrically resistive wall, and the third electrically resistive wall extend outwardly from a central axis and are separated about the central axis from one another by an oblique angle.

8. The battery pack of claim 7, wherein the central axis is parallel relative the longitudinal axis of the first battery cell, the longitudinal axis of the second battery cell, and the longitudinal axis of the fourth battery cell, and wherein the central axis is offset relative the longitudinal axis of the third battery cell by an angle.

9. The battery pack of claim 2, wherein the electrically conductive member includes a base provided adjacent a first end of the electrically conductive member, wherein the electrically conductive member extends from the base through a length of the separator from one of the first and second electrically conductive terminals of the first battery cell and along the longitudinal direction of the first battery cell, and wherein a second end of the electrically conductive member opposite the first end extends beyond the other of the first and second electrically conductive terminals to support a circuit control device.

10. The battery pack of claim 1, wherein the electrically conductive member includes
a first end having a support pad,
a second end supporting a circuit component, and
a plurality of tabs formed thereon between the first end and the second end,
wherein the tabs are configured to retain the electrically conductive member within the separator.

11. The battery pack of claim 1, wherein the electrically conductive member is any of a power strap configured to carry power, a voltage tap configured carry voltage, and a signal conductor configured to communicate signal.

12. The battery pack of claim 1, wherein the battery pack is a power tool battery pack.

13. A battery cell separator forming a barrier between adjacent battery cells in a battery pack assembly, each battery cell including first and second opposing terminals and a cell body extending therebetween along a longitudinal direction, the battery cell separator comprising:
a conductor electrically connecting the terminals of two or more battery cells in the battery pack together, the conductor extending along a length of the battery cell separator in a first direction; and
a wall extending along the first direction and supporting the adjacent battery cells in a predetermined arrangement, the first direction and the longitudinal direction being substantially parallel relative one another while the adjacent battery cells are in the predetermined arrangement;
wherein a portion of the conductor is overmolded with the wall.

14. The battery cell separator of claim 13, wherein the wall is formed of an electrically insulating material, and wherein the wall is configured to extend between the cell bodies of adjacent battery cells to prevent electrical connection between battery cells other than through the conductor.

15. The battery cell separator of claim 13, wherein the conductor extends through the wall along the first direction, and wherein the portion of the conductor overmolded with the wall includes one or more tabs configured to retain the conductor within the wall.

16. The battery cell separator of claim 13, further comprising a plurality of walls formed of an electrically insulating material, wherein the wall is a first wall in the plurality of walls, and wherein each wall in the plurality of walls is configured to support a conductor overmolded thereby.

17. The battery cell separator of claim 16, wherein each wall in the plurality of walls extends outwardly from a common axis, wherein each wall in the plurality of walls is offset relative another of the plurality of walls about the common axis by an oblique angle, and wherein the common axis is a central axis extending parallel relative the first direction.

18. The battery cell separator of claim 13, wherein the conductor includes
a first end having a support pad,
a second end opposite the first end along the first direction, the second end supporting one or more circuit components, and
a plurality of retainers formed therein between the first end and the second end,
wherein the plurality of retainers is configured to prevent removal of the conductor from the wall.

* * * * *